(12) United States Patent
Kobayashi et al.

(10) Patent No.: US 6,744,904 B2
(45) Date of Patent: Jun. 1, 2004

(54) MULTIFUNCTION ACOUSTIC DEVICE

(75) Inventors: Takashi Kobayashi, Yamanashi-ken (JP); Akira Nikaido, Tachikawa (JP)

(73) Assignee: Citizen Electronics Co., Ltd., Fujiyoshida (JP)

( * ) Notice: Subject to any disclaimer, the term of this patent is extended or adjusted under 35 U.S.C. 154(b) by 0 days.

(21) Appl. No.: 09/946,454

(22) Filed: Sep. 6, 2001

(65) Prior Publication Data

US 2002/0031239 A1 Mar. 14, 2002

(30) Foreign Application Priority Data

Sep. 12, 2000 (JP) .................................. 2000-277353

(51) Int. Cl.[7] .............................................. H04R 25/00
(52) U.S. Cl. ........................ 381/396; 381/162; 381/421
(58) Field of Search ................................ 381/162, 412, 381/414, 406, 423, 396, 165, 421; 340/388.1, 391.1, 392.2, 393.1

(56) References Cited

U.S. PATENT DOCUMENTS

| 3,794,865 A | * | 2/1974 | Guttinger | 310/82 |
| 4,220,879 A | * | 9/1980 | Hoshimi et al. | 310/68 R |
| 4,260,920 A | * | 4/1981 | Nakamura et al. | 310/156.05 |
| 4,864,276 A | * | 9/1989 | Tribbey et al. | 340/407.1 |
| 4,931,765 A | * | 6/1990 | Rollins et al. | 340/407.1 |
| 4,995,658 A | * | 2/1991 | Shiraki et al. | 292/336.3 |
| 5,101,131 A | * | 3/1992 | Ushiro et al. | 310/258 |
| 5,107,540 A | * | 4/1992 | Mooney et al. | 381/431 |
| 5,654,598 A | * | 8/1997 | Horski | 310/67 R |
| 5,793,143 A | * | 8/1998 | Harris et al. | 310/263 |
| 5,861,686 A | * | 1/1999 | Lee | 310/36 |
| 5,883,967 A | * | 3/1999 | House | 381/398 |
| 5,956,622 A | * | 9/1999 | Lee | 340/7.6 |
| 6,222,287 B1 | * | 4/2001 | Suzuki | 310/49 R |
| 6,479,912 B2 | * | 11/2002 | Kikuchi et al. | 310/51 |
| 6,624,911 B1 | * | 9/2003 | Cooper et al. | 358/1.9 |
| 6,639,992 B2 | * | 10/2003 | Kobayashi et al. | 381/396 |
| 2002/0064295 A1 | * | 5/2002 | Kobayashi et al. | 381/418 |
| 2002/0076078 A1 | * | 6/2002 | Kobayashi et al. | 381/396 |
| 2002/0097890 A1 | * | 7/2002 | Kobayashi et al. | 381/412 |

FOREIGN PATENT DOCUMENTS

| JP | 2002165290 A | * | 6/2002 | 381/412 |

* cited by examiner

*Primary Examiner*—Curtis Kuntz
*Assistant Examiner*—P. Dabney
(74) *Attorney, Agent, or Firm*—Dennison, Schultz, Dougherty & MacDonald (57) ABSTRACT

A speaker vibrating plate having a voice coil secured thereto is provided in a frame, a rotor having poles is rotatably supported in the frame, and a stator having poles is provided in the frame. A permanent magnet is provided in the rotor for forming a magnetic circuit passing through the rotor and the stator, and a stator coil is provided in the stator. A driving circuit is provided for energizing the stator coil for rotating the rotor.

11 Claims, 7 Drawing Sheets

MULTIFUNCTION ACOUSTIC DEVICE

BACKGROUND OF THE INVENTION

The present invention relates to a multifunction acoustic device used in a portable instrument such as a portable telephone.

There has been provided an acoustic device of the portable instrument in which a speaker is provided for generating sounds of calling signals, and a vibrating motor is provided for informing the receiver of calling signals without generating sounds. In such a device, since both of the speaker and the motor are mounted in the device, the device is increased in size and weight, and in manufacturing cost.

In recent years, there is provided a multifunction acoustic device in order to remove the above described disadvantages. The multifunction acoustic device comprises a speaker having a vibrating plate and a permanent magnet magnetically connected to a voice coil mounted on the vibrating plate of the speaker. The permanent magnet is independently vibrated at a low frequency of 100–150 Hz so as to inform the receiving of calling signals by the vibration of the case of the device, which is transmitted to the body of the user of the device.

Figure 7:
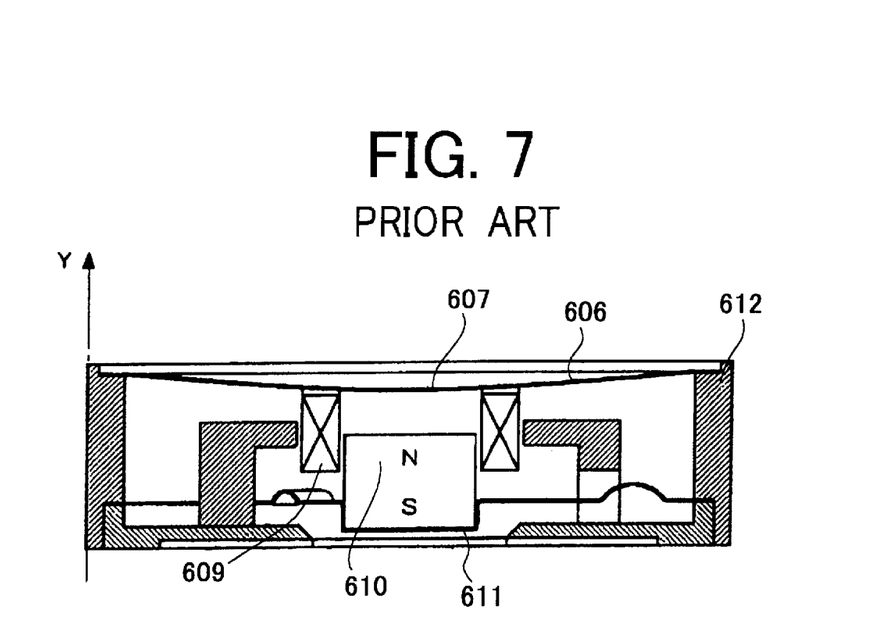
FIG. 7 is a sectional view of a conventional electromagnetic induction converter.

FIG. 7 is a sectional view of a conventional electromagnetic induction converter disclosed in Japanese Patent Laid Open 5-85192. The converter comprises a diaphragm 606 mounted in a case 612 at a periphery thereof, a voice coil 609 secured to the underside of a central portion 607 of the diaphragm 606, a spring plate 611 mounted in the case 612, and a permanent magnet 610 secured to a central portion of the spring plate 611, inserted in the voice coil 609.

By applying a low or high frequency signal to the voice coil 609, the spring plate 611 is vibrated in the polarity direction Y of the magnet 610.

In the device, the diaphragm 606 and the spring plate 611 are relatively moved through the magnetic combination between the voice coil 609 and the magnet 610. Consequently, when a low frequency signal or a high frequency signal is applied to the voice coil 609, both of the diaphragm 606 and the spring plate 611 are sequentially vibrated. As a result, sounds such as voice, music and others generated from the device are distorted, thereby reducing the quality of the sound. In addition, vibrating both of the voice coil 609 and the magnet 610 causes the low frequency vibration of the magnet to superimpose on the magnetic combination of the voice coil 609 and the magnet 610, which further largely distorts the sounds.

Figure 8:
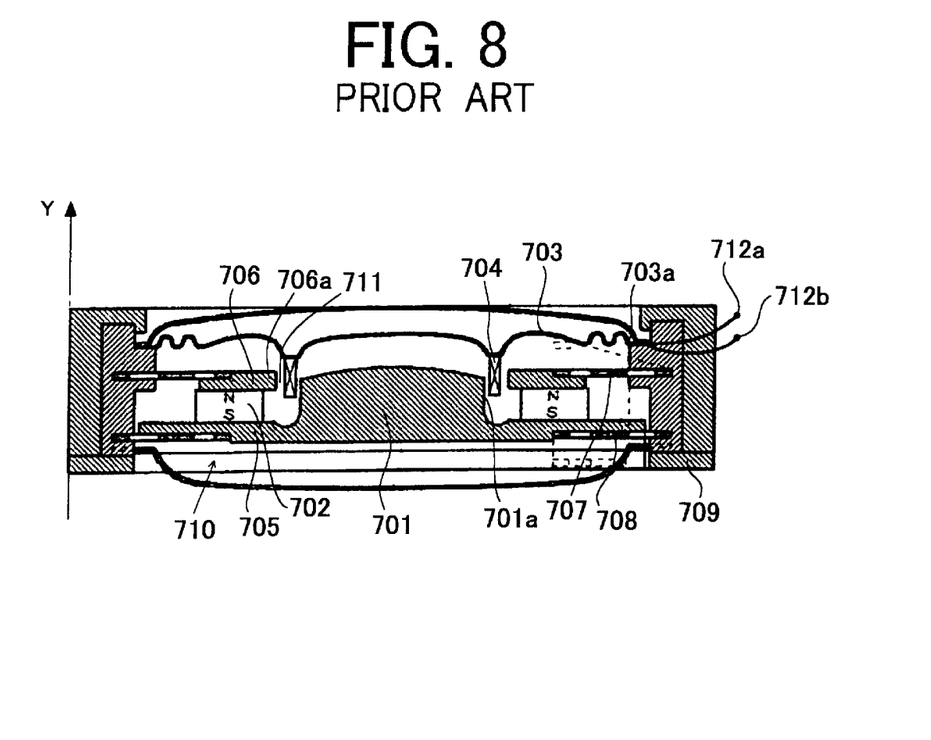
FIG. 8 is a sectional view showing a conventional multifunction acoustic device.

FIG. 8 is a sectional view showing a conventional multifunction acoustic device. The device comprises a speaker vibrating plate 703 made of plastic and having a corrugated periphery 703a and a central dome, a voice coil 704 secured to the underside of the vibrating plate 703 at a central portion, and a magnet composition 710. The vibrating plate 703 is secured to a frame 709 with adhesives.

The magnetic composition 710 comprises a lower yoke 705, a core 701 formed on the yoke 705 at a central portion thereof, an annular permanent magnet 702 mounted on the lower yoke 705, and an annular upper yoke 706 mounted on the permanent magnet 702. The lower yoke 705 and the upper yoke 706 are resiliently supported in the frame 709 by spring plates 707 and 708. A magnetic gap 711 is formed between a periphery 701a of the core 701 and an inside wall 706a of the upper yoke 706 to be magnetically connected to the voice coil 704.

When an alternating voltage is applied to the voice coil 704 through input terminals 712a and 712b, the speaker vibrating plate 703 is vibrated in the direction Y to generate sounds at a frequency between 700 Hz and 5 KHz. If a low frequency signal or a high frequency signal is applied to the voice coil 704, the speaker vibrating plate 703 and the magnetic composition 710 are sequentially vibrated, since the magnetic composition 710 and the speaker vibrating plate 703 are relatively moved through the magnetic combination of the voice coil 704 and the magnet composition 710.

As a result, sounds such as voice, music and others generated from the device are distorted, thereby reducing the quality of the sound. In addition, the driving of both the voice coil 704 and the magnetic composition 710 causes the low frequency vibration to superimpose on the magnetic combination of the voice coil 704 and the magnetic composition 710, which further largely distorts the sounds.

Figure 9:
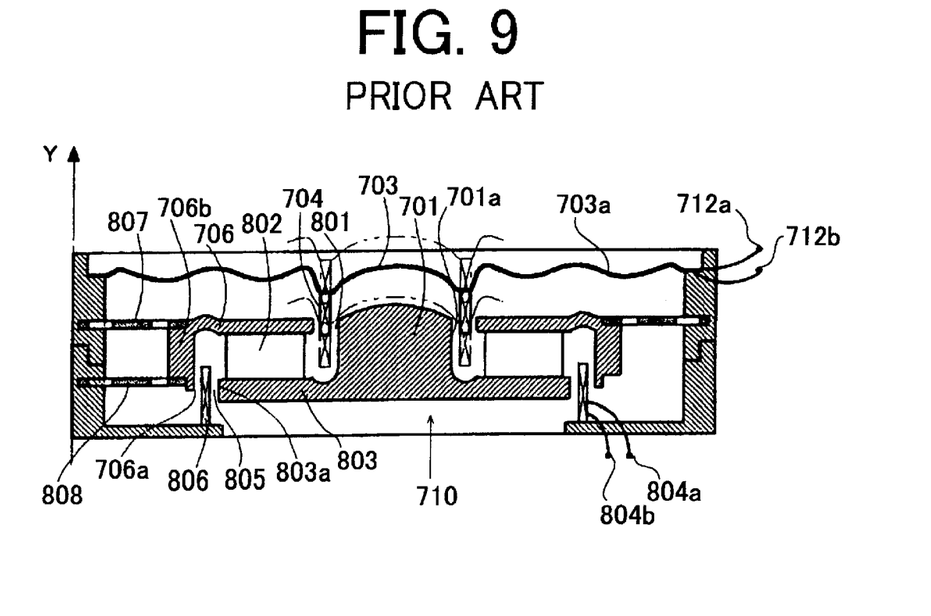
FIG. 9 is a sectional view showing another conventional multifunction acoustic device.

FIG. 9 is a sectional view showing another conventional multifunction acoustic device. The device comprises the speaker vibrating plate 703 made of plastic and having the corrugated periphery 703a and the central dome, the voice coil 704 secured to the underside of the vibrating plate 703 at a central portion, and the magnet composition 710. The vibrating plate 703 is secured to the frame 709 with adhesives.

The magnetic composition 710 comprises a lower yoke 803, core 701 formed on the yoke 803 at a central portion thereof, an annular permanent magnet 802 secured to the lower yoke 803, and annular upper yoke 706 having a peripheral wall 706b and mounted on the permanent magnet 702. The upper yoke 706 is resiliently supported in the frame 709 by spring plates 807 and 808. A first magnetic gap 801 is formed between a periphery 701a of the core 701 and an inside wall 706a of the upper yoke 706 to be magnetically connected to the voice coil 704. A second gap 805 is formed between a periphery 803a of the lower yoke 803 and inside wall 706a of the upper yoke 706. A driving coil 806 is secured to the frame and inserted in the second gap 805.

When an alternating voltage is applied to the voice coil 704 through input terminals 712a and 712b, the speaker vibrating plate 703 is vibrated in the direction Y to generate sounds at a frequency between 700 Hz and 5 KHz. If a low frequency signal or a high frequency signal is applied to the voice coil 704, the speaker vibrating plate 703 and the magnetic composition 710 are sequentially vibrated, since the magnetic composition 710 and the speaker vibrating plate 703 are relatively moved through the magnetic combination of the voice coil 704 and the magnet composition 710.

When a high frequency signal for music is applied to the voice coil 704, only the speaker vibrating plate 703 is vibrated. Therefore, there does not occur distortion of the sound. Furthermore, when a low frequency signal is applied to the driving coil 806, only the magnetic composition 710 is vibrated, and the speaker vibrating plate 703 is not vibrated.

However if a high frequency signal is applied to input terminals 712a, 712b, and a low frequency signal is also applied to input terminals 804a, 804b, the speaker vibrating plate 703 and magnetic composition 710 are sequentially vibrated, thereby reducing the sound quality.

In the above described conventional devices, both the speaker vibration plate and the magnetic composition are vibrated when a low frequency signal or a high frequency signal is applied to the voice coil. This is caused by the reason that the low frequency vibrating composition is vibrated in the same direction as the high frequency vibrating direction.

SUMMARY OF THE INVENTION

An object of the present invention is to provide a multifunction acoustic device in which a vibrating member is not vibrated together with another vibrating member, thereby removing disadvantages of conventional devices.

According to the present invention, there is provided a multifunction acoustic device comprising a frame, a speaker vibrating plate supported in the frame, a voice coil secured to the speaker vibrating plate, a rotor having magnetic poles and rotatably supported in the frame, a stator having magnetic poles and provided in the frame, corresponding to the rotor, a first permanent magnet provided on the rotor, at least one coil for forming magnetic fluxes between the magnetic poles of the rotor and the magnetic poles of the stator.

The device further comprises eccentric means provided on the rotor for vibrating the rotor during the rotation of the rotor.

The first permanent magnet is an annular magnet, and the voice coil is disposed in a gap formed in the annular magnet.

In an aspect of the invention, the coil is disposed in the stator.

A second permanent magnet is provided in the gap for increasing a magnetic flux density in the gap.

The eccentric means is a weight eccentrically provided in the rotor.

The device further comprises a driving circuit for energizing the coil in the stator for rotating the rotor.

In a further aspect of the invention, the rotor comprises a lower rotor yoke rotatably mounted in the frame, and an upper rotor yoke secured to the lower rotor yoke, and the stator comprises a lower stator yoke and an upper stator yoke secured to the lower stator yoke.

The first permanent magnet is disposed between the lower rotor yoke and the upper rotor yoke, and the stator coil is disposed between the lower stator yoke and the upper stator yoke, and the rotor and the stator are formed into a synchronous motor.

These and other objects and features of the present invention will become more apparent from the following detailed description with reference to the accompanying drawings.

DETAILED DESCRIPTION OF THE PREFERRED EMBODIMENT

Figure 1:
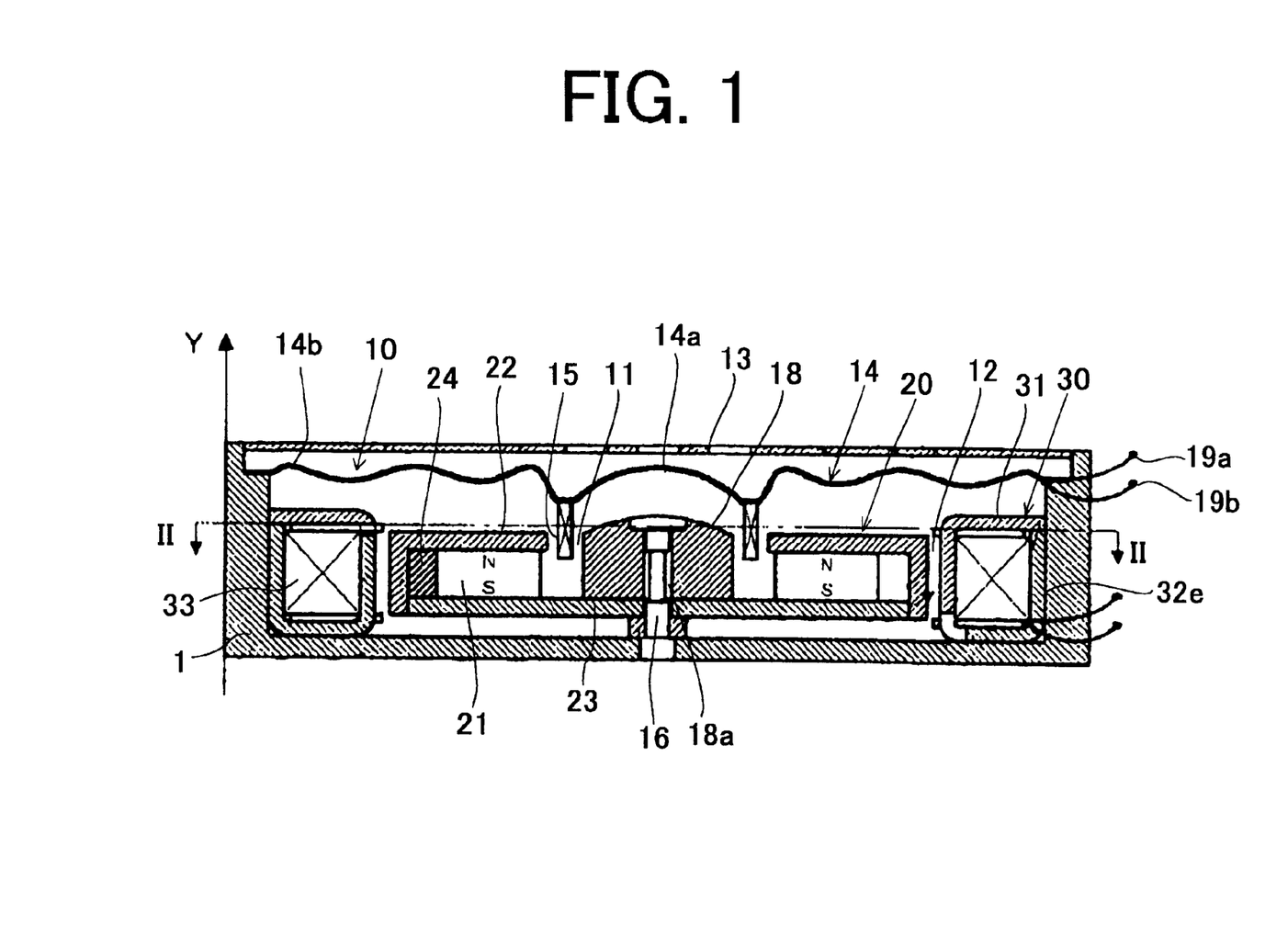
FIG. 1 is a sectional view of a multifunction acoustic device as a first embodiment of the present invention.
Figure 2:
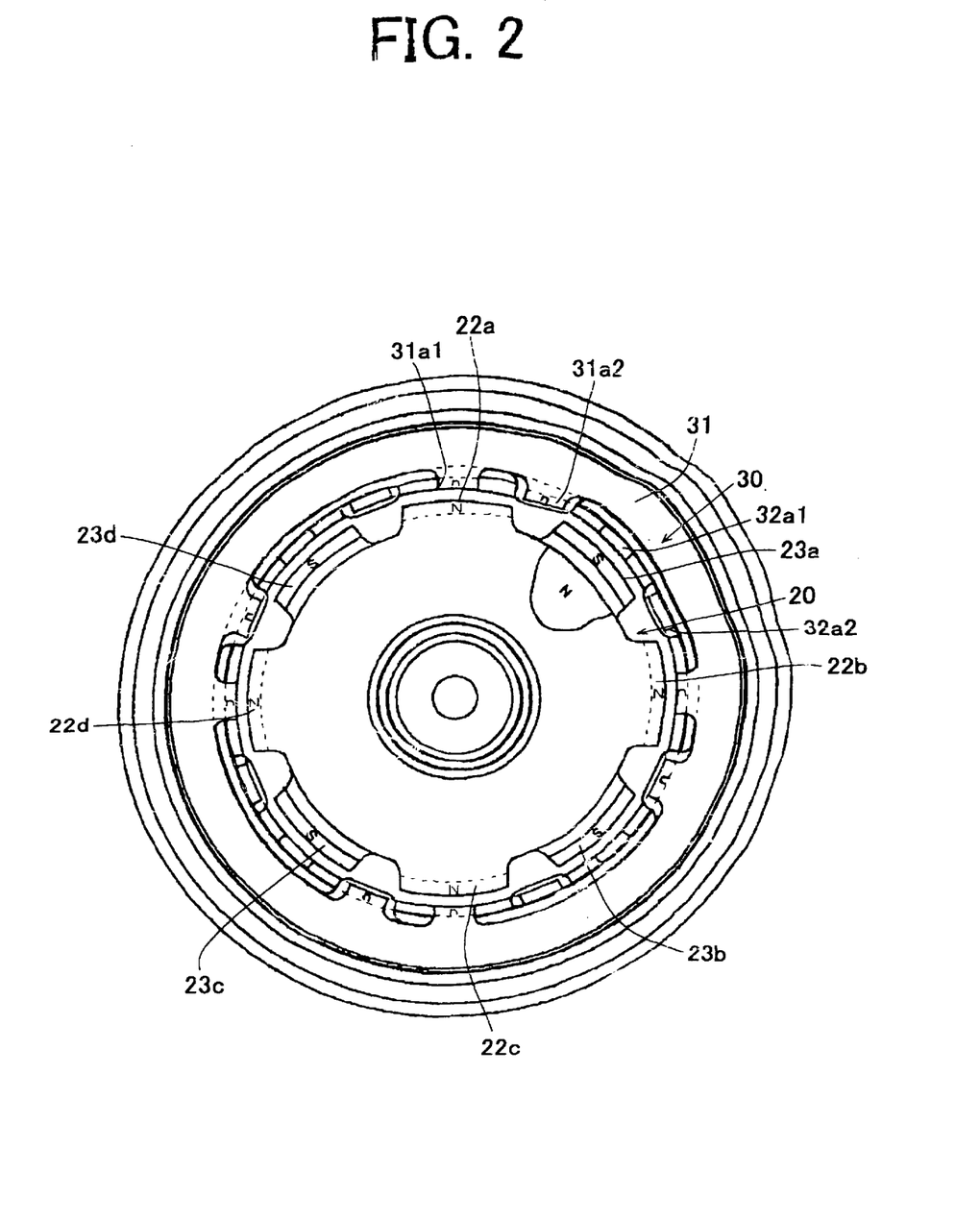
FIG. 2 is a sectional view taken along a line II—II of FIG. 1.

Referring to FIGS. 1 and 2, the multifunction acoustic device of the present invention comprises a sound generating device 10, a rotor 20 and an annular stator 30 provided in a cylindrical frame 1 made of plastic. The sound generating device 10 comprises a speaker vibrating plate 14 having a central dome 14a and secured to the frame at a periphery 14b with adhesives, a voice coil 15 secured to the underside of the speaker vibrating plate 14. The speaker vibrating plate 14 is covered by a cover 13 having a plurality of sound discharge holes and secured to the frame 1 at a peripheral edge thereof.

The rotor 20 comprises a lower rotor yoke 23 secured to a rotor shaft 16 rotatably mounted on a base plate of the frame 1, central top yoke 18 secured to the lower rotor yoke 23 and secured to the rotor shaft 16 at a central hole 18a thereof, an annular permanent magnet 21 securely mounted on the lower rotor yoke 23 and an annular upper rotor yoke 22 secured to the lower rotor yoke 23 and mounted on the permanent magnet 21. The permanent magnet 21 is axially magnetized in single polarity. The voice coil 15 is disposed in a first gap 11 formed between the outside wall of the top yoke 18 and the inside wall of the upper rotor yoke 22.

Figure 3:
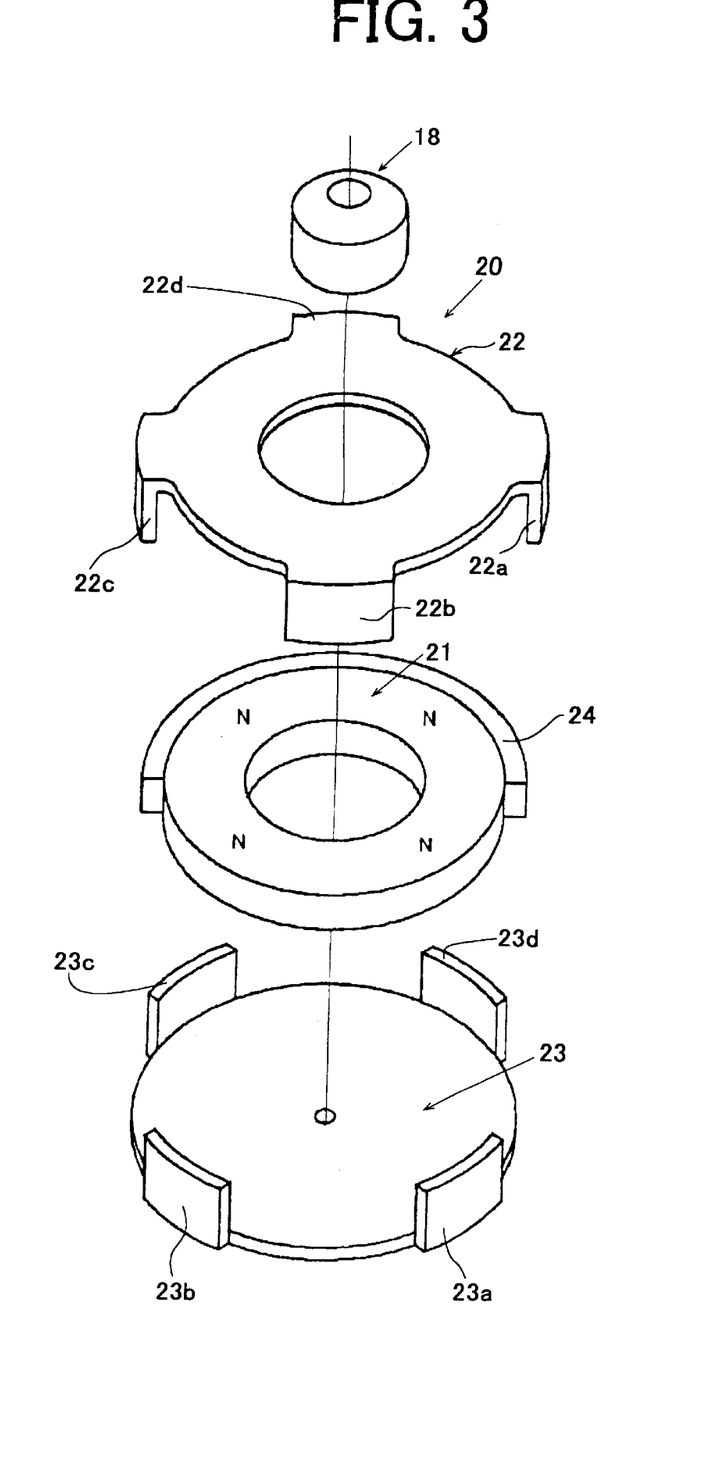
FIG. 3 is an exploded perspective view of a rotor of the multifunction acoustic device of the present invention.

Referring to FIG. 3, the upper rotor yoke 22 has four magnetic poles 22a, 22b, 22c and 22d. Each of the magnetic poles is formed by bending a radially extending projection in the axial direction and toward the lower rotor yoke 23. The lower rotor yoke 23 has four magnetic poles 23a, 23b, 23c and 23d each of which extends in the axial direction and toward the upper rotor yoke 22. The magnetic poles of the upper rotor yoke and magnetic poles of the lower rotor yoke are alternately disposed on the same circle as shown in FIG. 2. Couples of magnetic poles 22a and 23a (22b and 23b, 22c and 23c, 22d and 23d) are angularly disposed at one magnetic pole pitch of 90 degrees (electric angle 360°).

The width of the magnetic pole of each of the magnetic poles 22a to 23d is suitably selected from widths smaller than 45 degrees. The shape of the magnetic pole may be triangular. A semicircular weight 24 made of plastic including heavy particles such as tungsten particles is disposed around the permanent magnet 21. As another means, the permanent magnet 21 may be eccentrically disposed with respect to the rotor shaft 16. A second gap 12 is formed between the periphery of the rotor 20 and the inside wall of the stator 30. As shown in FIGS. 1 and 2, the annular stator 30 is disposed around the rotor 20.

Figure 4:
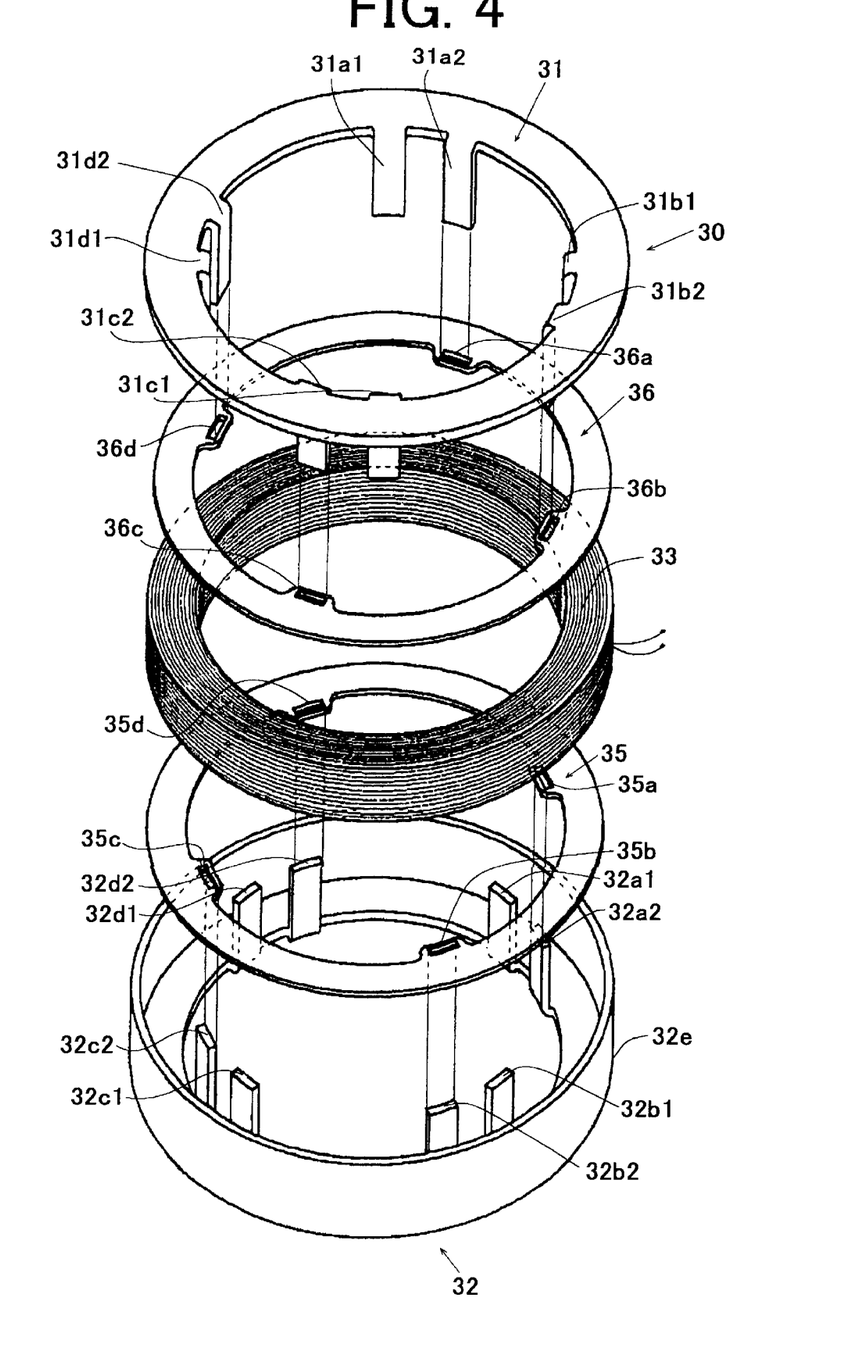
FIG. 4 is an exploded perspective view of a stator of the multifunction acoustic device of the present invention.

Referring to FIG. 4, the stator 30 comprises an annular stator coil 33, annular upper and lower shading plates 36 and 35 disposed on the upper and lower sides of the annular coil 33, and annular upper and lower stator yokes 31 and 32. The upper stator yoke 31 has four main magnetic poles 31a1, 31b1, 31c1 and 31d1, and four auxiliary magnetic poles 31a2, 31b2, 31c2 and 31d2. Each of the magnetic poles extends in the axial direction and toward the lower stator yoke 32. The lower stator yoke 32 has four main magnetic poles 32a1, 32b1, 32c1 and 32d1 and four auxiliary magnetic poles 32a2, 32b2, 32c2 and 32d2.

A couple of upper main and auxiliary magnetic poles 31a1 and 31a2 and a couple of lower main and auxiliary magnetic poles 32a1 and 32a2, and other couples of the magnetic poles are angularly disposed at one magnetic pole pitch of 90 degrees (electric angle 360°). The sum of widths of the main magnetic pole and the auxiliary magnetic pole is within 45 degrees, and the width of the main magnetic pole is larger than that of the auxiliary magnetic pole.

The couple of upper main and auxiliary magnetic poles and the couple of lower main and auxiliary magnetic poles are alternately disposed on the same circle as shown in FIG. 2.

The upper shading plate 36 has four holes 36a, 36b, 36c and 36d, each formed in a projection projected from the inside wall of the shading plate 36 in the radially inward direction. Similarly, the lower shading plate 35 has four holes 35a, 35b, 35c and 35d. The auxiliary magnetic poles 31a2, 31b2, 31c2 and 31d2 of the upper stator yoke 31 are inserted in the holes 36a–36d of the upper shading plate 36. Similarly, the auxiliary magnetic poles 32a2, 32b2, 32c2 and 32d2 of the lower stator yoke 32 are inserted in the holes 35a–35d of the lower shading plate 35.

Referring to FIGS. 1 and 4, the lower stator yoke 32 has a cylindrical peripheral wall 32e. The lower shading plate 35 is mounted on the lower stator yoke 32 between the peripheral wall 32e and main and auxiliary magnetic poles. The stator coil 33, upper shading plate 36, and upper stator plate 31 are stacked on the lower shading plate 35 in order. Thus, the rotor 20 and stator 30 are composed in a synchronous motor.

It will be understood that the motor can be made into a stepping motor having a permanent magnet rotor having multiple polarities.

The magnetomotive force of the permanent magnet 21 is applied to the first and second gaps 11 and 12 in parallel, so that a necessary magnetic flux density is provided.

Figure 5:
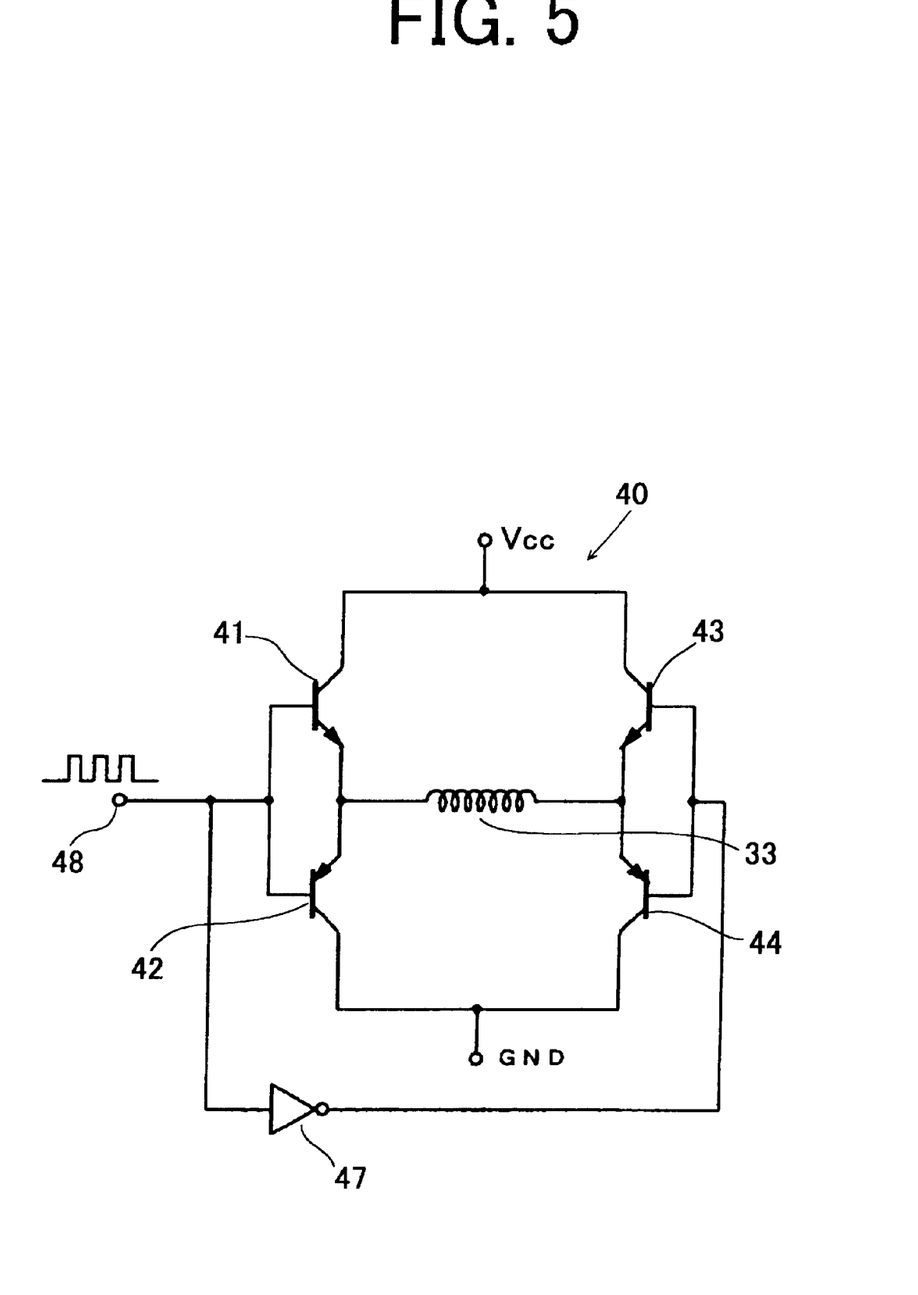
FIG. 5 is a driving circuit used in the multifunction acoustic device of the present invention.

Referring to FIG. 5, a rotor driving circuit 40 comprises a pair of NPN transistors 41 and 43 and a pair of PNP transistors 42 and 44 which are connected crosswise, interposing the stator coil 33. Bases of the transistors 41 and 42 are connected to an input terminal 48, bases of the transistors 43 and 44 are connected to the input terminal 48 through an inverter 47.

In operation, when a high frequency signal is applied to input terminals 19a and 19b (FIG. 1) of the voice coil 15, the speaker vibrating plate 14 is vibrated in the Y direction (FIG. 1) to generate sounds.

When a low frequency signal of about 100–300 Hz is applied to input terminal 48 of the driving circuit 40, the transistors 41 and 44 are turned on at a high level of the input signal. Consequently, a current passes the stator coil 33 through the transistors 41 and 44 from the Vcc to GND. And the current passes through the transistor 43, coil 33 and transistor 42 at a low level of the input signal. Thus, an alternate current of the low frequency corresponding to the input low frequency signal flows in the stator coil 33. Consequently, couples of main pole 32a1 and auxiliary pole 32a2 to poles 32d1 and 32d2 are energized. At that time, magnetic flux generated by four auxiliary poles 31a2, 31b2, 31c2 and 31d2, and magnetic flux generated by four auxiliary poles 32a2, 32b2, 32c2 and 32d2 are delayed in phase by eddy currents passing through holes 36a–36d of the upper shading plate 36 and holes 35a–35d of the lower shading plate 35 to produce a shifting magnetic field to generate rotating power in a predetermined direction. Thus, the rotor 20 is rotated at the driving low frequency. Since the weight 24 is eccentrically mounted on the rotor 20, the rotor vibrates in radial direction. The vibration is transmitted to user's body through the frame 1 and a case of the device so that a calling signal is informed to the user.

The number N of rotation of the rotor is expressed as follows.

$$N = 60f/Z \text{ (rpm)} \qquad 1$$

where
Z is a pair of number of poles of the rotor,
f is driving frequency.
The load torque TL is expressed as follows.

$$TL = \mu r R \omega^2 M \text{ (N·m)} \qquad 2$$

where
M is the mass of weight 24 of the rotor,
R is the length between the center of the rotor shaft 16 and the center of gravity of the weight 24,
r is the radius of the rotor shaft 16,
$\mu$ is the friction coefficient between the rotor shaft 16 and the rotor 20,
$\omega$ is the number of rotation (rad/sec) of the rotor 20.

Since the rotor 20 merely bears the load torque TL, the power consumption of the device is small.

If a lower frequency signal is applied to the input terminal 48 to rotate the rotor 20 during the generating sounds by the speaker vibrating plate 14, the magnetic flux density in the first gap 11 does not change from the magnetic flux density when only the speaker vibrating plate 14 is vibrated.

Figure 6:
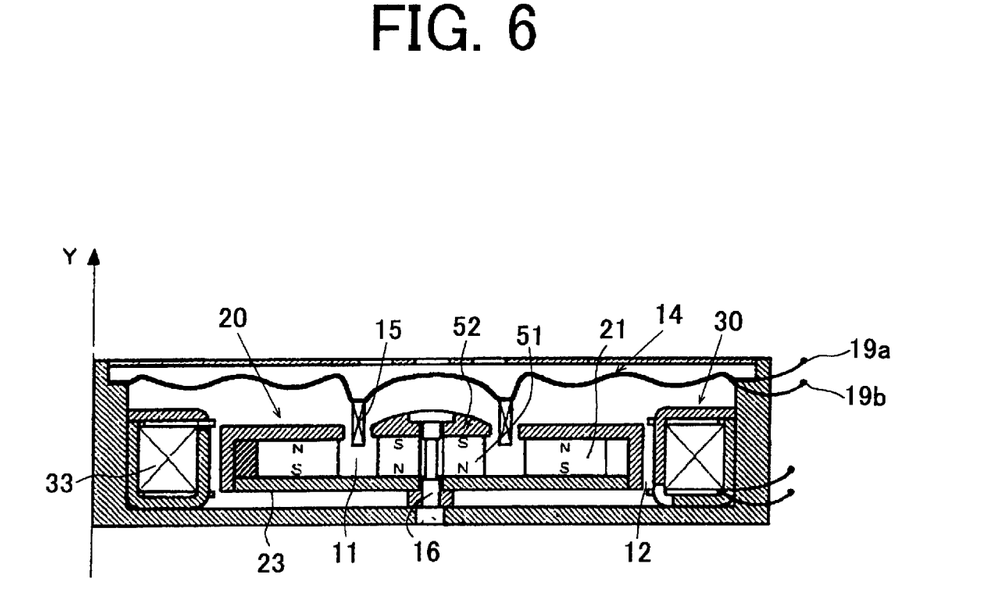
FIG. 6 is a sectional view of a multifunction acoustic device as a second embodiment of the present invention.

Referring to FIG. 6 showing the second embodiment of the present invention, the same parts as the first embodiment are identified by the same reference numerals as those of FIG. 1, and the explanation thereof is omitted. A central annular permanent magnet 51 is securely mounted on the lower rotor yoke 23 around the shaft 16. On the permanent magnet 51, a top yoke 52 is secured. The permanent magnets 21 and 51 are magnetized in reverse directions, so that the magnetic flux density of the first gap 11 between both the magnets is increased. Construction of other portions is the same as the first embodiment.

Since the magnetic flux density in the first gap 11 is high, the sounds generated by the speaker vibrating plate 14 are not influenced by the rotation of the rotor 20. Therefore, quality of sounds generated by the vibrating plate does not reduce even if the rotor 20 rotates.

Although the synchronous motor is used in the above described embodiments, other motors such as a stepping motor, a direct current motor and others can be used. Further, the rotor can be disposed outside the stator.

From the foregoing description, it will be understood that the present invention provides a multifunction acoustic device which may generate sounds and vibration of the frame at the same time without reducing sound quality. In the prior art, since the speaker vibrating plate and the magnetic composition are vibrated in the same direction, the thickness of the device increases. In the device of the present invention, since the magnetic composition rotates, the thickness of the device can be reduced.

While the invention has been described in conjunction with preferred specific embodiment thereof, it will be understood that this description is intended to illustrate and not limit the scope of the invention, which is defined by the following claims.

What is claimed is:

1. A multifunction acoustic device comprising:
    a cylindrical frame having an axis;
    an annular stator having magnetic poles and provided in a side wall of the cylindrical frame on a plane perpendicular to the axis of the frame;
    a rotor provided in a space within the stator and rotatably supported by a rotating shaft along the axis, said rotor having magnetic poles in a facing relation to the magnetic poles of the stator along the plane of the stator perpendicular to the axis of the frame;

at least one coil mounted on the stator for producing magnetic fluxes between the magnetic poles of the rotor and the magnetic poles of the stator for rotating the rotor;

a speaker vibrating plate adjacent to the stator and supported in the frame;

a voice coil secured to the speaker vibrating plate;

at least one permanent magnet mounted on the rotor for producing magnetic fluxes for vibrating the vibrating plate and for rotating the rotor.

2. The device according to claim 1 further comprising eccentric means provided on the rotor for vibrating the rotor during the rotation of the rotor.

3. The device according to claim 1 wherein the first permanent magnet is an annular magnet.

4. The device according to claim 2 wherein the eccentric means is a weight eccentrically provided in the rotor.

5. The device according to claim 3 wherein the voice coil is disposed in a gap formed in the annular magnet.

6. The device according to claim 5 further comprising a second permanent magnet provided in the gap for increasing a magnetic flux density in the gap.

7. The device according to claim 5 further comprising a driving circuit for energizing the coil in the stator for rotating the rotor.

8. The device according to claim 7 wherein the rotor comprises a lower rotor yoke rotatably mounted in the frame, and the an upper rotor yoke secured to the lower rotor yoke, and the stator comprises a lower stator yoke and an upper stator yoke secured to the lower stator yoke.

9. The device according to claim 8 wherein the first permanent magnet is disposed between the lower rotor yoke and the upper rotor yoke, and the stator coil is disposed between the lower stator yoke and the upper stator yoke.

10. The device according to claim 9 wherein the rotor and the stator are formed into a synchronous motor.

11. The device according to claim 9 wherein each of the lower and upper rotor yokes has a plurality of magnetic poles, and each of the lower and upper stator yokes has a plurality of magnetic poles.

* * * * *